United States Patent
Troyansky et al.

(10) Patent No.: US 9,495,539 B2
(45) Date of Patent: *Nov. 15, 2016

(54) METHOD AND SYSTEM FOR PROTECTION AGAINST INFORMATION STEALING SOFTWARE

(71) Applicant: Websense, LLC, Austin, TX (US)

(72) Inventors: Lidror Troyansky, Givatayim (IL); Sharon Bruckner, Tel Aviv (IL); Daniel Lyle Hubbard, Carlsbad, CA (US)

(73) Assignee: Websense, LLC, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/688,944

(22) Filed: Apr. 16, 2015

(65) Prior Publication Data

US 2015/0220732 A1    Aug. 6, 2015

Related U.S. Application Data

(63) Continuation of application No. 12/051,579, filed on Mar. 19, 2008, now Pat. No. 9,015,842.

(51) Int. Cl.
*G06F 17/00* (2006.01)
*G06F 21/55* (2013.01)
(Continued)

(52) U.S. Cl.
CPC .......... *G06F 21/552* (2013.01); *G06F 21/56* (2013.01); *G06F 21/577* (2013.01);
(Continued)

(58) Field of Classification Search
CPC ........................ G06F 21/552; H04L 63/1483
USPC ................ 726/25, 1, 22, 23, 24; 713/188
See application file for complete search history.

(56) References Cited

U.S. PATENT DOCUMENTS

| 5,414,833 A | 5/1995 | Hershey et al. |
| 5,581,804 A | 12/1996 | Cameron et al. |

(Continued)

FOREIGN PATENT DOCUMENTS

| CN | 1367595 | 9/2002 |
| CN | 1756147 A | 4/2006 |

(Continued)

OTHER PUBLICATIONS

"Google + StopBadward.org = Internet Gestapo?", http://misterpoll.wordpress.com/2007/01/05/google-stopbadwareorg-internet-gestapo/, Jan. 5, 2007.

(Continued)

*Primary Examiner* — Abu Sholeman
(74) *Attorney, Agent, or Firm* — Schwegman Lundberg & Woessner, P.A.

(57) ABSTRACT

A system and method for identifying infection of unwanted software on an electronic device is disclosed. A software agent configured to generate a bait and is installed on the electronic device. The bait can simulate a situation in which the user performs a login session and submits personal information or it may just contain artificial sensitive information. Parameters may be inserted into the bait such as the identity of the electronic device that the bait is installed upon. The output of the electronic device is monitored and analyzed for attempts of transmitting the bait. The output is analyzed by correlating the output with the bait and can be done by comparing information about the bait with the traffic over a computer network in order to decide about the existence and the location of unwanted software. Furthermore, it is possible to store information about the bait in a database and then compare information about a user with the information in the database in order to determine if the electronic device that transmitted the bait contains unwanted software.

17 Claims, 7 Drawing Sheets

(51) Int. Cl.
*G06F 21/56* (2013.01)
*G06F 21/57* (2013.01)
*H04L 29/06* (2006.01)
*G06F 11/00* (2006.01)

(52) U.S. Cl.
CPC ...... *H04L 63/1416* (2013.01); *H04L 63/1483* (2013.01); *H04L 63/1491* (2013.01); *G06F 2221/033* (2013.01); *G06F 2221/2101* (2013.01)

(56) References Cited

U.S. PATENT DOCUMENTS

| | | | |
|---|---|---|---|
| 5,590,403 A | 12/1996 | Cameron et al. | |
| 5,596,330 A | 1/1997 | Yokev et al. | |
| 5,712,979 A | 1/1998 | Graber et al. | |
| 5,720,033 A | 2/1998 | Deo | |
| 5,724,576 A | 3/1998 | Letourneau | |
| 5,801,747 A | 9/1998 | Bedard | |
| 5,828,835 A | 10/1998 | Isfeld et al. | |
| 5,832,228 A | 11/1998 | Holden et al. | |
| 5,899,991 A | 5/1999 | Karch | |
| 5,905,495 A | 5/1999 | Tanaka et al. | |
| 5,919,257 A | 7/1999 | Trostle | |
| 5,937,404 A | 8/1999 | Csaszar et al. | |
| 6,012,832 A | 1/2000 | Saunders et al. | |
| 6,092,194 A | 7/2000 | Touboul | |
| 6,185,681 B1 | 2/2001 | Zizzi | |
| 6,252,884 B1 | 6/2001 | Hunter | |
| 6,301,658 B1 | 10/2001 | Koehler | |
| 6,338,088 B1 | 1/2002 | Waters et al. | |
| 6,357,010 B1 | 3/2002 | Viets et al. | |
| 6,460,141 B1 | 10/2002 | Olden | |
| 6,493,758 B1 | 12/2002 | McLain | |
| 6,654,787 B1 | 11/2003 | Aronson et al. | |
| 6,732,180 B1 | 5/2004 | Hale et al. | |
| 6,804,780 B1 | 10/2004 | Touboul | |
| 6,832,230 B1 | 12/2004 | Zilliacus et al. | |
| 6,988,209 B1 | 1/2006 | Balasubramaniam et al. | |
| 7,051,200 B1 | 5/2006 | Manferdelli et al. | |
| 7,058,822 B2 | 6/2006 | Edery et al. | |
| 7,069,447 B1* | 6/2006 | Corder .................... G06F 21/79 713/168 | |
| 7,080,000 B1 | 7/2006 | Cambridge | |
| 7,089,589 B2 | 8/2006 | Chefalas et al. | |
| 7,100,199 B2 | 8/2006 | Ginter et al. | |
| 7,136,867 B1 | 11/2006 | Chatterjee et al. | |
| 7,155,243 B2 | 12/2006 | Baldwin et al. | |
| 7,185,361 B1 | 2/2007 | Ashoff et al. | |
| 7,249,175 B1 | 7/2007 | Donaldson | |
| 7,346,512 B2 | 3/2008 | Wang et al. | |
| 7,376,969 B1 | 5/2008 | Njemanze et al. | |
| 7,447,215 B2 | 11/2008 | Lynch et al. | |
| 7,464,407 B2 | 12/2008 | Nakae et al. | |
| 7,522,910 B2 | 4/2009 | Day | |
| 7,536,437 B2 | 5/2009 | Zmolek | |
| 7,617,532 B1 | 11/2009 | Alexander et al. | |
| 7,634,463 B1 | 12/2009 | Katragadda et al. | |
| 7,644,127 B2 | 1/2010 | Yu | |
| 7,693,945 B1 | 4/2010 | Dulitz et al. | |
| 7,707,157 B1 | 4/2010 | Shen | |
| 7,725,937 B1 | 5/2010 | Levy | |
| 7,783,706 B1 | 8/2010 | Robinson | |
| 7,787,864 B2 | 8/2010 | Provo | |
| 7,814,546 B1 | 10/2010 | Strayer et al. | |
| 7,818,800 B1* | 10/2010 | Lemley, III ............. G06F 21/50 726/22 | |
| 7,832,011 B2* | 11/2010 | Obrecht ................ G06F 21/566 713/150 | |
| 7,991,411 B2 | 8/2011 | Johnson et al. | |
| 8,041,769 B2 | 10/2011 | Shraim et al. | |
| 8,065,728 B2 | 11/2011 | Wang et al. | |
| 8,078,625 B1 | 12/2011 | Zhang et al. | |
| 8,165,049 B2 | 4/2012 | Salmi | |
| 8,205,098 B2 | 6/2012 | Malpani | |
| 8,315,178 B2 | 11/2012 | Makhoul et al. | |
| 8,407,798 B1* | 3/2013 | Lotem .................... G06F 21/55 726/18 | |
| 8,498,628 B2 | 7/2013 | Shapiro et al. | |
| 8,528,091 B2 | 9/2013 | Bowen et al. | |
| 8,621,614 B2 | 12/2013 | Vaithilingam et al. | |
| 8,655,342 B2 | 2/2014 | Weinzierl | |
| 8,695,100 B1 | 4/2014 | Cosoi | |
| 8,769,671 B2 | 7/2014 | Shraim et al. | |
| 8,769,684 B2 | 7/2014 | Stolfo et al. | |
| 2001/0047474 A1 | 11/2001 | Takagi | |
| 2002/0078045 A1 | 6/2002 | Dutta | |
| 2002/0087882 A1 | 7/2002 | Schneier et al. | |
| 2002/0091947 A1 | 7/2002 | Nakamura | |
| 2002/0095592 A1 | 7/2002 | Daniell et al. | |
| 2002/0099952 A1 | 7/2002 | Lambert et al. | |
| 2002/0129140 A1 | 9/2002 | Peled et al. | |
| 2002/0129277 A1 | 9/2002 | Caccavale | |
| 2002/0133606 A1 | 9/2002 | Mitomo et al. | |
| 2002/0147915 A1 | 10/2002 | Chefalas et al. | |
| 2002/0162015 A1 | 10/2002 | Tang | |
| 2002/0174358 A1 | 11/2002 | Wolff et al. | |
| 2002/0194490 A1 | 12/2002 | Halperin et al. | |
| 2002/0199095 A1 | 12/2002 | Bandini et al. | |
| 2003/0018491 A1 | 1/2003 | Nakahara et al. | |
| 2003/0018903 A1 | 1/2003 | Greca et al. | |
| 2003/0074567 A1 | 4/2003 | Charbonneau | |
| 2003/0093694 A1 | 5/2003 | Medvinsky et al. | |
| 2003/0101348 A1 | 5/2003 | Russo et al. | |
| 2003/0110168 A1 | 6/2003 | Kester et al. | |
| 2003/0135756 A1 | 7/2003 | Verma | |
| 2003/0172292 A1 | 9/2003 | Judge | |
| 2003/0177361 A1 | 9/2003 | Wheeler et al. | |
| 2003/0185395 A1 | 10/2003 | Lee et al. | |
| 2003/0185399 A1 | 10/2003 | Ishiguro | |
| 2003/0188197 A1 | 10/2003 | Miyata et al. | |
| 2003/0195852 A1 | 10/2003 | Campbell et al. | |
| 2003/0202536 A1 | 10/2003 | Foster et al. | |
| 2004/0003139 A1 | 1/2004 | Cottrille et al. | |
| 2004/0003286 A1 | 1/2004 | Kaler et al. | |
| 2004/0034794 A1 | 2/2004 | Mayer et al. | |
| 2004/0039921 A1 | 2/2004 | Chuang | |
| 2004/0111632 A1 | 6/2004 | Halperin | |
| 2004/0111636 A1 | 6/2004 | Baffes et al. | |
| 2004/0117624 A1 | 6/2004 | Brandt et al. | |
| 2004/0139351 A1 | 7/2004 | Tsang | |
| 2004/0153644 A1 | 8/2004 | McCorkendale | |
| 2004/0162876 A1 | 8/2004 | Kohavi | |
| 2004/0172557 A1 | 9/2004 | Nakae et al. | |
| 2004/0187029 A1 | 9/2004 | Ting | |
| 2004/0203615 A1 | 10/2004 | Qu et al. | |
| 2004/0255147 A1 | 12/2004 | Peled et al. | |
| 2004/0260924 A1 | 12/2004 | Peled et al. | |
| 2005/0025291 A1 | 2/2005 | Peled et al. | |
| 2005/0027980 A1 | 2/2005 | Peled et al. | |
| 2005/0033967 A1 | 2/2005 | Morino et al. | |
| 2005/0048958 A1 | 3/2005 | Mousseau et al. | |
| 2005/0055327 A1 | 3/2005 | Agrawal et al. | |
| 2005/0066197 A1 | 3/2005 | Hirata et al. | |
| 2005/0086520 A1 | 4/2005 | Dharmapurikar et al. | |
| 2005/0091535 A1 | 4/2005 | Kavalam et al. | |
| 2005/0108557 A1 | 5/2005 | Kayo et al. | |
| 2005/0111367 A1 | 5/2005 | Chao et al. | |
| 2005/0120229 A1 | 6/2005 | Lahti | |
| 2005/0131868 A1 | 6/2005 | Lin et al. | |
| 2005/0138109 A1 | 6/2005 | Redlich et al. | |
| 2005/0138353 A1 | 6/2005 | Spies | |
| 2005/0149726 A1 | 7/2005 | Joshi et al. | |
| 2005/0154900 A1* | 7/2005 | Muttik .................... G06F 21/55 713/188 | |
| 2005/0210035 A1 | 9/2005 | Kester et al. | |
| 2005/0223001 A1 | 10/2005 | Kester et al. | |
| 2005/0229250 A1 | 10/2005 | Ring et al. | |
| 2005/0251862 A1 | 11/2005 | Talvitie | |
| 2005/0273858 A1 | 12/2005 | Zadok et al. | |
| 2005/0283836 A1 | 12/2005 | Lalonde et al. | |
| 2005/0288939 A1 | 12/2005 | Peled et al. | |
| 2006/0004636 A1 | 1/2006 | Kester et al. | |
| 2006/0020814 A1 | 1/2006 | Lieblich et al. | |

(56) References Cited

U.S. PATENT DOCUMENTS

| | | |
|---|---|---|
| 2006/0021031 A1 | 1/2006 | Leahy et al. |
| 2006/0026105 A1 | 2/2006 | Endoh |
| 2006/0026681 A1 | 2/2006 | Zakas |
| 2006/0031504 A1 | 2/2006 | Hegli et al. |
| 2006/0036874 A1 | 2/2006 | Cockerille et al. |
| 2006/0053488 A1 | 3/2006 | Sinclair et al. |
| 2006/0068755 A1 | 3/2006 | Shraim et al. |
| 2006/0080735 A1 | 4/2006 | Brinson et al. |
| 2006/0095459 A1 | 5/2006 | Adelman et al. |
| 2006/0095965 A1 | 5/2006 | Phillips et al. |
| 2006/0098585 A1 | 5/2006 | Singh et al. |
| 2006/0101514 A1 | 5/2006 | Milener et al. |
| 2006/0129644 A1 | 6/2006 | Owen et al. |
| 2006/0191008 A1 | 8/2006 | Fernando et al. |
| 2006/0212723 A1 | 9/2006 | Sheymov |
| 2006/0251068 A1 | 11/2006 | Judge et al. |
| 2006/0259948 A1 | 11/2006 | Calow et al. |
| 2006/0265750 A1 | 11/2006 | Huddleston |
| 2006/0272024 A1 | 11/2006 | Huang et al. |
| 2006/0277259 A1 | 12/2006 | Murphy et al. |
| 2006/0282890 A1 | 12/2006 | Gruper et al. |
| 2006/0288076 A1 | 12/2006 | Cowings et al. |
| 2007/0005762 A1 | 1/2007 | Knox et al. |
| 2007/0011739 A1 | 1/2007 | Zamir et al. |
| 2007/0027965 A1 | 2/2007 | Brenes et al. |
| 2007/0028302 A1 | 2/2007 | Brennan et al. |
| 2007/0067844 A1 | 3/2007 | Williamson et al. |
| 2007/0101430 A1* | 5/2007 | Raikar .................. H04L 12/585 726/24 |
| 2007/0143424 A1 | 6/2007 | Schirmer et al. |
| 2007/0150827 A1 | 6/2007 | Singh et al. |
| 2007/0156833 A1 | 7/2007 | Nikolov et al. |
| 2007/0169191 A1 | 7/2007 | Greene et al. |
| 2007/0195779 A1 | 8/2007 | Judge et al. |
| 2007/0199054 A1 | 8/2007 | Florencio et al. |
| 2007/0220607 A1 | 9/2007 | Sprosts et al. |
| 2007/0250920 A1 | 10/2007 | Lindsay |
| 2007/0260602 A1 | 11/2007 | Taylor |
| 2007/0261112 A1 | 11/2007 | Todd et al. |
| 2007/0294199 A1 | 12/2007 | Nelken et al. |
| 2007/0294428 A1 | 12/2007 | Guy et al. |
| 2007/0294524 A1 | 12/2007 | Katano |
| 2007/0299915 A1 | 12/2007 | Shraim et al. |
| 2008/0009268 A1 | 1/2008 | Ramer et al. |
| 2008/0040804 A1 | 2/2008 | Oliver et al. |
| 2008/0047017 A1 | 2/2008 | Renaud |
| 2008/0086638 A1 | 4/2008 | Mather |
| 2008/0100414 A1 | 5/2008 | Diab et al. |
| 2008/0184369 A1 | 7/2008 | Ahn et al. |
| 2008/0216168 A1 | 9/2008 | Larson et al. |
| 2008/0226069 A1 | 9/2008 | Tan |
| 2008/0262991 A1 | 10/2008 | Kapoor et al. |
| 2008/0267144 A1 | 10/2008 | Jano et al. |
| 2008/0282338 A1 | 11/2008 | Beer |
| 2008/0282344 A1 | 11/2008 | Shuster |
| 2008/0295177 A1 | 11/2008 | Dettinger et al. |
| 2009/0007243 A1 | 1/2009 | Boodaei et al. |
| 2009/0064326 A1 | 3/2009 | Goldstein |
| 2009/0064330 A1 | 3/2009 | Shraim et al. |
| 2009/0093999 A1* | 4/2009 | Kearns .................. G01N 29/4481 702/184 |
| 2009/0100055 A1 | 4/2009 | Wang |
| 2009/0100518 A1 | 4/2009 | Overcash |
| 2009/0119402 A1 | 5/2009 | Shull et al. |
| 2009/0131035 A1 | 5/2009 | Aiglstorfer |
| 2009/0144823 A1 | 6/2009 | Lamastra et al. |
| 2009/0222920 A1 | 9/2009 | Chow et al. |
| 2009/0241173 A1 | 9/2009 | Troyansky |
| 2009/0241187 A1 | 9/2009 | Troyansky |
| 2009/0241191 A1 | 9/2009 | Keromytis et al. |
| 2009/0241196 A1 | 9/2009 | Troyansky et al. |
| 2009/0320135 A1 | 12/2009 | Cavanaugh |
| 2010/0017879 A1 | 1/2010 | Kuegler et al. |
| 2010/0024037 A1 | 1/2010 | Grzymala-Busse et al. |
| 2010/0031320 A1* | 2/2010 | Bhesania .................. G06F 21/83 726/4 |
| 2010/0064347 A1 | 3/2010 | More et al. |
| 2010/0069127 A1 | 3/2010 | Fiennes |
| 2010/0077223 A1 | 3/2010 | Maruyama et al. |
| 2010/0077483 A1 | 3/2010 | Stolfo et al. |
| 2010/0198928 A1 | 8/2010 | Almeida |
| 2010/0257603 A1 | 10/2010 | Chander et al. |
| 2010/0269175 A1 | 10/2010 | Stolfo et al. |
| 2010/0310061 A1 | 12/2010 | Lin et al. |
| 2010/0312843 A1 | 12/2010 | Robinson |
| 2012/0047217 A1 | 2/2012 | Hewes et al. |

FOREIGN PATENT DOCUMENTS

| | | |
|---|---|---|
| CN | 101060421 | 10/2007 |
| EP | 1 180 889 | 2/2002 |
| EP | 1 278 330 | 1/2003 |
| EP | 1 280 040 | 1/2003 |
| EP | 1 457 885 | 9/2004 |
| EP | 1 510 945 | 3/2005 |
| EP | 1571578 A | 9/2005 |
| EP | 1 638 016 | 3/2006 |
| EP | 1 643 701 A1 | 4/2006 |
| GB | 2418330 | 3/2006 |
| JP | 2000-235540 | 8/2000 |
| WO | WO 96/05549 A1 | 2/1996 |
| WO | WO 96/42041 | 3/1997 |
| WO | WO 01/24012 | 3/2001 |
| WO | WO 2005/017708 | 2/2005 |
| WO | WO 2005/119488 | 12/2005 |
| WO | WO 2006/027590 | 3/2006 |
| WO | WO 2006/062546 | 6/2006 |
| WO | WO 2006/136605 | 12/2006 |
| WO | WO 2007/059428 A | 5/2007 |
| WO | WO 2007/106609 | 9/2007 |

OTHER PUBLICATIONS

"Trends in Badware 2007", StopBadware.org.
Adam Lyon, "Free Spam Filtering Tactics Using Eudora,", May 21, 2004, pp. 1-4.
Borck, James R., Clearswift makes a clean sweep of Web threats, originally downloaded from http://www.infoworld.com/d/security-central/clearswift-makes-clean-sweep-web-threats-818., Aug. 22, 2007, pp. 2.
Broder et al., Network Applications of Bloom Filters: A Survey, Internet Mathematics, Apr. 13, 2004, vol. 1, Issue 4, pp. 485-509.
Clear Text Password Risk Assessment Documentation, SANS Institute, 2002.
Cohen, F., A Cryptographic Checksum for Integrity Protection, Computers & Security, Elsevier Science Publishers, Dec. 1, 1987, vol. 6, Issue 6, pp. 505-510, Amsterdam, NL.
Dahan, M. Ed., "The Internet and government censorship: the case of the Israeli secretservice" Online information., Proceedings of the International Online Information Meeting, Oxford, Learned Infomration, GB, Dec. 12-14, 1989, vol. Meeting 13, December, Issue XP000601363, pp. 41-48, Sections 1,3., London.
Gittler F., et al., The DCE Security Service, Pub: Hewlett-Packard Journal, Dec. 1995, pp. 41-48.
Honoroff, Jacob, An Examination of Bloom Filters and their Applications, originally downloaded from http://cs.unc.edu/~fabian/courses/CS600.624/slides/bloomslides.pdf, Mar. 16, 2006, pp. 113.
IBM Technical Disclosure Bulletin, Mean to Protect System from Virus, IBM Corp., Aug. 1, 1994, Issue 659-660.
Igakura, Tomohiro et al., Specific quality measurement and control of the service-oriented networking application., Technical Report of IEICE, IEICE Association, Jan. 18, 2002, vol. 101, Issue 563, pp. 51-56, Japan.
International Search Report and Written Opinion for International Application No. PCT/GB2005/003482, Dec. 9, 2005.
International Search Report for PCT/US2010/035992, Aug. 11, 2010.
IronPort Web Reputation White Paper, A Comprehensive, Proactive Approach to Web-Based Threats, Ironport Systems 2009, pp. 10.

(56) References Cited

OTHER PUBLICATIONS

IronPort Web Reputation: Protect and Defend Against URL-Based Threats; Ironport Systems, Apr. 2006, 8 pages.

Long, John A., Risk and the Right Model, originally downloaded from http://www.dtic.mil/cgi-bin/GetTRDoc?Location=U2&doc=GEtTRDoc.pdf&AD=ADA161757, Jan. 1986, pp. 13.

PCT International Search Report and Written Opinion for International Application No. PCT/US2008/052483, Feb. 11, 2009.

Reid, Open Systems Security: Traps and Pitfalls, Computer & Security, 1995, Issue 14, pp. 496-517.

Resnick, P. et al., "PICS: Internet Access Controls Without Censorship", Communications of the Association for Comuting Machinery, ACM, Oct. 1, 1996, vol. 39, Issue 10, pp. 87-93, New York, NY.

Rubenking, Neil J., Norton Confidential, originally downloaded from http://www.pcmag.com/article2/0,2817,1999239,00.asp, Aug. 4, 2006, pp. 3.

Ruffo et al., EnFilter: A Password Enforcement and Filter Tool Based on Pattern Recognition Techniques, ICIAP 2005, LNCS 3617, pp. 75-82, 2005.

Shanmugasundaram et al, Payload Attribution via Hierarchical Bloom Filters, CCS, Oct. 25-29, 2004.

Shanmugasundaram et al., ForNet: A Distributed Forensics Network, In Proceedings of the Second International Workshop on Mathematical Methods, Models and Architectures for Computer Networks Security, 2003.

Song et al., Multi-pattern signature matching for hardware network intrusion detection systems, IEEE Globecom 2005, Jan. 23, 2006.

Spafford, Eugene, Prventing Weak Password Choices, Computer Science Technical Reports. Paper 875. http://docs.lib.purdue.edu/cstech/875, 1991.

Stein, Web Security—a step by step reference guide, Addison-Wesley, 1997, pp. 387-415.

Symantec Corporation, E-security begins with sound security policies, Announcement Symantec, XP002265695, Jun. 14, 2001, pp. 1,9.

Wang et al., MBF: a Real Matrix Bloom Filter Representation Method on Dynamic Set, 2007 IFIP International Conference on Network and Parallel Computing—Workshops, Sep. 18, 2007, pp. 733-736, Piscataway, NJ, USA.

Williams, R., Data Integrity with Veracity, Retrieved from the Internet: <URL: ftp://ftp.rocksoft.com/clients/rocksoft/papers/vercty10.ps>, Sep. 12, 1994.

Yang et al., Performance of Full Text Search in Structured and Unstructured Peer-to-Peer Systems, Proceedings IEEE Infocom; originally downloaded from http://ieeexplore.ieee.org/stamp/stamp.jsp?arnumber=04146962, 2006, pp. 12.

Zhang Yao Long, "Research and Application of Behavior Recognition in Anti-spam System," Outstanding Master's Degree Thesis of China, Issue 11, Nov. 15, 2006.

Zhang et al., The Role of URLs in Objectionable Web Content Categorization, Web Intelligence, 2006.

Aviv et al., SSARES: Secure Searchable Automated Remote Email Storage, 23rd Annual Computer Security Applications Conference, Jan. 2, 2008, pp. 129-138.

George, Erica, "Google launches new anti-badware API", http://blog.stopbadware.org//2007/06/19/google-launches-new-anti-badware-api, Jun. 19, 2007.

National Institute of Standards (NIST) Special Publication 800-63, Electronic Authentication Guidelin, Apr. 2006, 65 pages.

\* cited by examiner

METHOD AND SYSTEM FOR PROTECTION AGAINST INFORMATION STEALING SOFTWARE

CROSS REFERENCE TO RELATED APPLICATIONS

This application is a continuation application of U.S. patent application Ser. No. 12/051,579, filed Mar. 19, 2008, and entitled "METHOD AND SYSTEM FOR PROTECTION AGAINST INFORMATION STEALING SOFTWARE," and assigned to the assignee hereof. The disclosure of this prior application is considered part of this application, and is hereby incorporated by reference in its entirety.

BACKGROUND OF THE INVENTION

1. Field of the Invention

The present invention relates generally to the field of information leak prevention. More specifically but not exclusively, the present invention deals with methods for an efficient identification of attempts to steal private and confidential information using information stealing software and phishing.

2. Description of the Related Technology

The information and knowledge created and accumulated by organizations and businesses are among their most valuable assets. As such, keeping the information and the knowledge inside the organization and restricting its distribution outside of it is of paramount importance for almost any organization, government entity or business, and provides a significant leverage of its value. Unauthorized dissemination of intellectual property, financial information and other confidential or sensitive information can significantly damage a company's reputation and competitive advantage. In addition, the private information of individuals inside organizations, as well as the private information of the clients, customers and business partners includes sensitive details that can be abused by a user with criminal intentions.

Another aspect of the problem is compliance with regulations with respect to information: Regulations within the United States of America, such as the Health Insurance Portability and Accountability Act (HIPAA), the Gramm-Leach-Bliley act (GLBA) and the Sarbanes Oxley act (SOX) mandate that the information assets within organizations be monitored and subjected to an information management policy, in order to protect clients privacy and to mitigate the risks of potential misuse and fraud. Information and data leakage therefore poses a severe risk from both business and legal perspectives.

One of the emerging threats regarding the privacy and the confidentiality of digital information is Information Stealing Software, such as Trojan Horses and "Spyware". Such software may be installed on the computer by malicious users that gained an access to the user's computer or by "infection" e.g., from a web-site, an email or shared files in a file-sharing network. The Information Stealing Software can then detect sensitive or confidential information—e.g., by employing a "keylogger" that logs keystrokes, or by searching for confidential information within the user's computer and sending it to a predefined destination.

Current attempts to deal with Information Stealing Software are based mainly on detection of their existence in the host—e.g., by looking at their signatures. However, as these types of software are carefully designed to avoid such detection, the effectiveness of this approach is limited Another aspect of information stealing is known as "phishing & pharming". In phishing attempts users are solicited, usually by officially-looking e-mails, to post their sensitive details to web-sites designed for stealing this information. There have been many attempts to mitigate phishing risks, such as helping users identify legitimate sites, alerting users to fraudulent websites, augmenting password logins and eliminating phishing mail. Yet, effective phishing attacks remain very common.

Pharming attacks aim to redirect a website's traffic to another, bogus website. Pharming can be conducted either by changing the hosts file on a victim's computer or by exploitation of a vulnerability in DNS server software. Current attempts to mitigate risks of pharming, such as DNS protection and web browser add-ins such as toolbars are of limited value.

SUMMARY

A system and method for identifying infection of unwanted software on an electronic device is disclosed. A software agent is configured to generate a bait and is installed on the electronic device. The bait can simulate a situation in which the user performs a login session and submits personal information or it may just contain artificial sensitive information. Additionally, parameters may be inserted into the bait such as the identity of the electronic device that the bait is installed upon. The electronic output of the electronic device is then monitored and analyzed for attempts of transmitting the bait. The output is analyzed by correlating the output with the bait and can be done by comparing information about the bait with the traffic over a computer network in order to decide about the existence and the location of unwanted software. Furthermore, it is possible to store information about the bait in a database and then compare information about a user with the information in the database in order to determine if the electronic device that transmitted the bait contains unwanted software.

It is also possible to simulate sensitive information within the bait in the context of a target site and then configure the simulated sensitive information to identify the electronic device. The target site is then monitored for detection of the simulated sensitive information to determine the existence of unwanted software on the electronic device.

A system for identifying unwanted software on at least one electronic device has a management unit in communication with the electronic device. The management unit is configured to install a software agent on the electronic device that generates a bait to be transmitted by the electronic device over a computer network as an output. The management unit can be configured to insert a parameter into the bait in order to identify the electronic device. A traffic analyzer in communication with the computer network analyzes the output of the electronic device. The traffic analyzer may be installed on a network gateway in communication with the computer network. A decision system in communication with the traffic analyzer correlates the bait from the electronic device with the output of the electronic device in order to determine the existence of unwanted software.

In addition to the foregoing, it is also possible to use two groups of electronic devices to determine the existence of unwanted software. In this scenario, a bait is installed on at least one of the electronic devices of the first group of electronic devices. The output of the first and second groups of electronic devices is monitored and analyzed wherein the second group of electronic devices is used as a baseline for analyzing the output of the first group of electronic devices.

The output of the first group and second group of electronic devices can be correlated in order to determine the existence of unwanted software.

A method for controlling the dissemination of sensitive information over an electronic network is disclosed. The method includes analyzing the traffic of the network and detecting the sensitive information. Next, the sensitivity level and the risk level of the information leaving the electronic network is assessed. A required action is determined based upon the sensitivity level and the risk level.

The sensitivity level of the information is assessed by analyzing the content of the information. The information may include a password and the sensitivity information may be analyzed by analyzing the strength of the password. For example, a strong password would indicate that the information is highly sensitive. The risk level of the information leaving the network may be assessed using heuristics including at least one of geolocation, analysis of a recipient URL, previous knowledge about the destination and analysis of the content of the site.

BRIEF DESCRIPTION OF THE DRAWINGS

For a better understanding of the invention and to show how the same may be carried into effect, reference will now be made, purely by way of example, to the accompanying drawings, in which.

DETAILED DESCRIPTION OF CERTAIN INVENTIVE EMBODIMENTS

Figure 1:
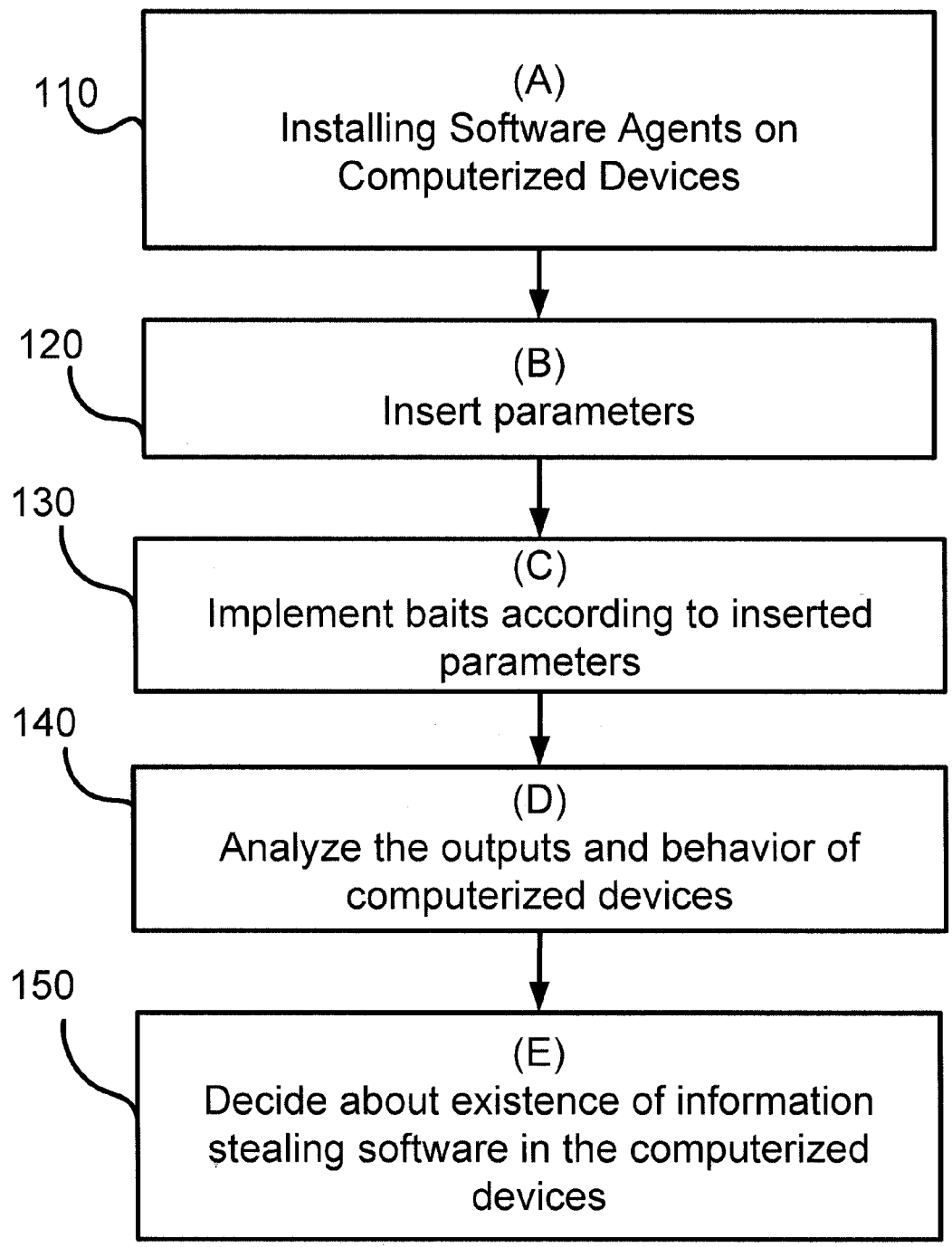
FIG. 1 is a flowchart illustrating a method of efficient detection of information stealing software.

The inventors of the systems and methods described in this application have recognized a need for, and it would be highly advantageous to have, a method and system that allows for efficient detection of information disseminated by information stealing software and for mitigation of phishing and pharming attacks, while overcoming the drawbacks described above.

The presently preferred embodiments describe a method and system for efficient mitigation of hazards stemming from information stealing. Before explaining at least one embodiment in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting. Also, it will be recognized that the described components may be implemented solely in software, hardware or the combination of both.

Behavioral detection of information stealing software in a potentially infected computerized device or software is achieved by simulating situations that will potentially trigger the information stealing software to attempt to disseminate "artificial sensitive information bait", and thereafter analyze the traffic and other behavioral patterns of the potentially infected computerized device or software. As the situation is controlled and the information bait is known to the system, there are many cases of infection in which such an analysis will be able to detect the existence of the information stealing software.

For example, some malware types, such as certain keyloggers, attempt to locate sensitive or personal information (e.g., usernames, passwords, financial information etc.). When such information is discovered, either locally on the host computer or as the user uses it to log into a website or application, the malware attempts to capture it and send it out, either in plaintext or encrypted. This behavior is exploited by generating bogus credentials and artificial sensitive information bait and storing it and/or sending them periodically to websites.

If such malware exists on the user's system, the malware captures the bogus information and attempts to send it out. Because the system provided this information in the first place, the system has a very good estimate of what the message sent by the malware will look like. Therefore, the system inspects all outgoing traffic from the user to spot these suspicious messages, and deduce the existence of malware on the machine. The system can simulate a situation in which the user attempts to access the website of a financial institute and submits his username and password. If an information stealing software is installed on the user's computer or along the connection, then by intercepting and analyzing the outgoing traffic the system can detect attempts to steal information.

Reference is now made to FIG. 1, which illustrates a method for detection of information stealing software. At stage A, 110, a software agent is installed on computerized devices. The software agent is preferably designed and implemented such that it can simulate various artificial inputs in a manner that would seem as a regular user input from the information stealing software perspective (e.g., emulating sequences of keystrokes, accessing sites of e-banking, planting documents that would seem to be sensitive etc.) At stage B, 120, in order to fine-tune the operation of the software agent, a set of parameters are preferably selected, such as scheduling bait tasks or providing keywords that produce an attractive bait in this context. At stage C, 130, various baits in the various computerized devices are implemented in accordance with the inserted parameters. Specifically, the baits are created and sent to predefined targets. At stage D, 140 the output and behavioral patterns of the computerized device are analyzed from the computer network and at stage E, 150, the system estimates the probability that the device is infected by an information stealing software from the output and behavioral patterns analyzed at stage D.

Figure 2:
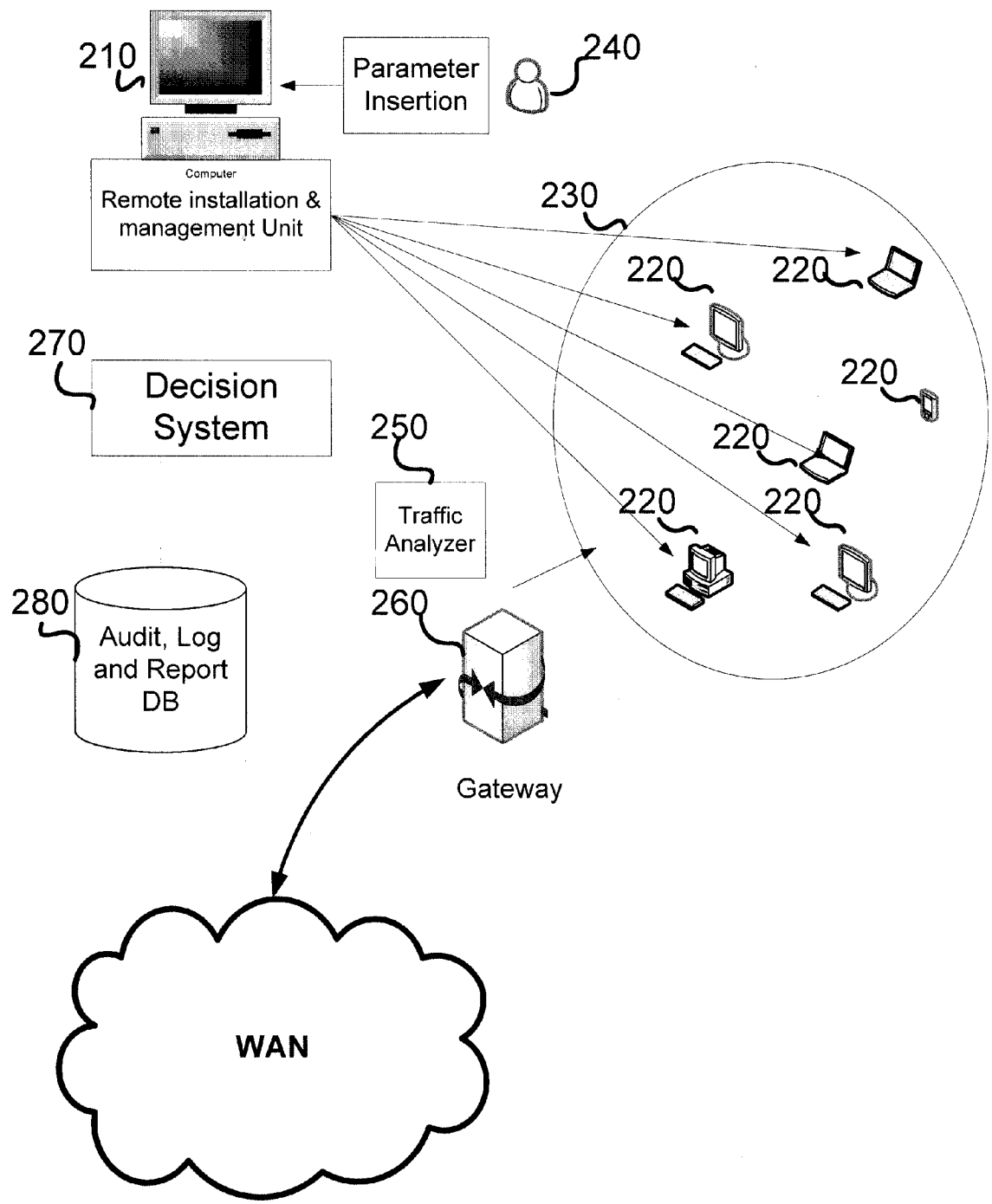
FIG. 2 is an illustration of a system for mitigation of information-stealing software hazards according to FIG. 1.

Turning now to FIG. 2, an illustration of a system for detection of information stealing software is provided. A remote installation & management unit 210 installs software agents 220 on various computerized devices 230 connected thereto by means ordinarily used in the art. The installation can include optional parameters inserted by an operator 240. The software agents produce artificial sensitive information baits, and the output and other behavioral parameters of the various computerized devices are analyzed by the software agents 220 and preferably by a traffic analyzer 250 on a network gateway 260. The traffic analyzer 250 may be software installed on the gateway for monitoring the flow of electronic traffic between the computer devices 230 and a WAN as is commonly known in the art. The results are sent for analysis to a decision system 270, which correlates the information in the traffic with the artificial sensitive information baits in order to decide about the existence and the location of potentially infected computerized devices or software. The decision system 270 may be a software or a hardware module in electronic communication with the traffic analyzer 250.

The artificial sensitive information bait typically comprises bogus personal data which is used to login to e-banks, payment services etc. and the system is operable to simulate a situation in which the user performs a login session to such service and submit personal information. The baits implemented on different devices or software components can have unique characteristics, which enable identification of the infected machine. The software agent produces emulated keystrokes (e.g., utilizing the keyboard and/or the mouse drivers) that produce a sequence of characters in a variable rate, that reflect natural typing.

Also, the system can produce artificial sensitive documents that would seem realistic—for example financial reports to be publicly released, design documents, password files, network diagrams, etc. . . . .

Also, the system can produce the baits in random fashion, such that each artificial sensitive information or document is different, in order to impede the information stealing software further.

The software agents implemented in the various devices are masqueraded in order to avoid detection by the information stealing software. The software agents can also be hidden, e.g., in a manner commonly referred to as rootkits, by means ordinarily used in the art.

In order to prevent unwelcome traffic to the target sites (e.g., sites of e-banking) in the process of simulation, the target sites can be emulated by the gateway 260. Accordingly, no information is actually sent to the target sites.

Sophisticated information stealing software may utilize special means to avoid detection, and may encrypt and/or hide the disseminated information. In a one embodiment, the system looks for encrypted content and correlates, statistically, the amount of encrypted data in the outgoing transportation with the number and size of the artificial sensitive information baits. This correlation may be a comparison, or it may be some other type of correlation. Detection of encrypted content can be based on the entropy of the content. In general, the sequence of bits that represent the encrypted content appears to be random (e.g., with maximal entropy). However, one should note that in an adequately compressed content there are also sequences of bits with maximal entropy, and therefore the system preferably utilizes the entropy test for encryption after establishing that the content is not compressed by a standard compression means ordinarily used in the art.

In order to further increase the probability of detection, in an organizational environment, the software agents may be installed on some of the machines and the system performs statistical tests, as explained below, in order to decide about the probability of existence of infected computerized devices and software in the organization.

Figure 3:
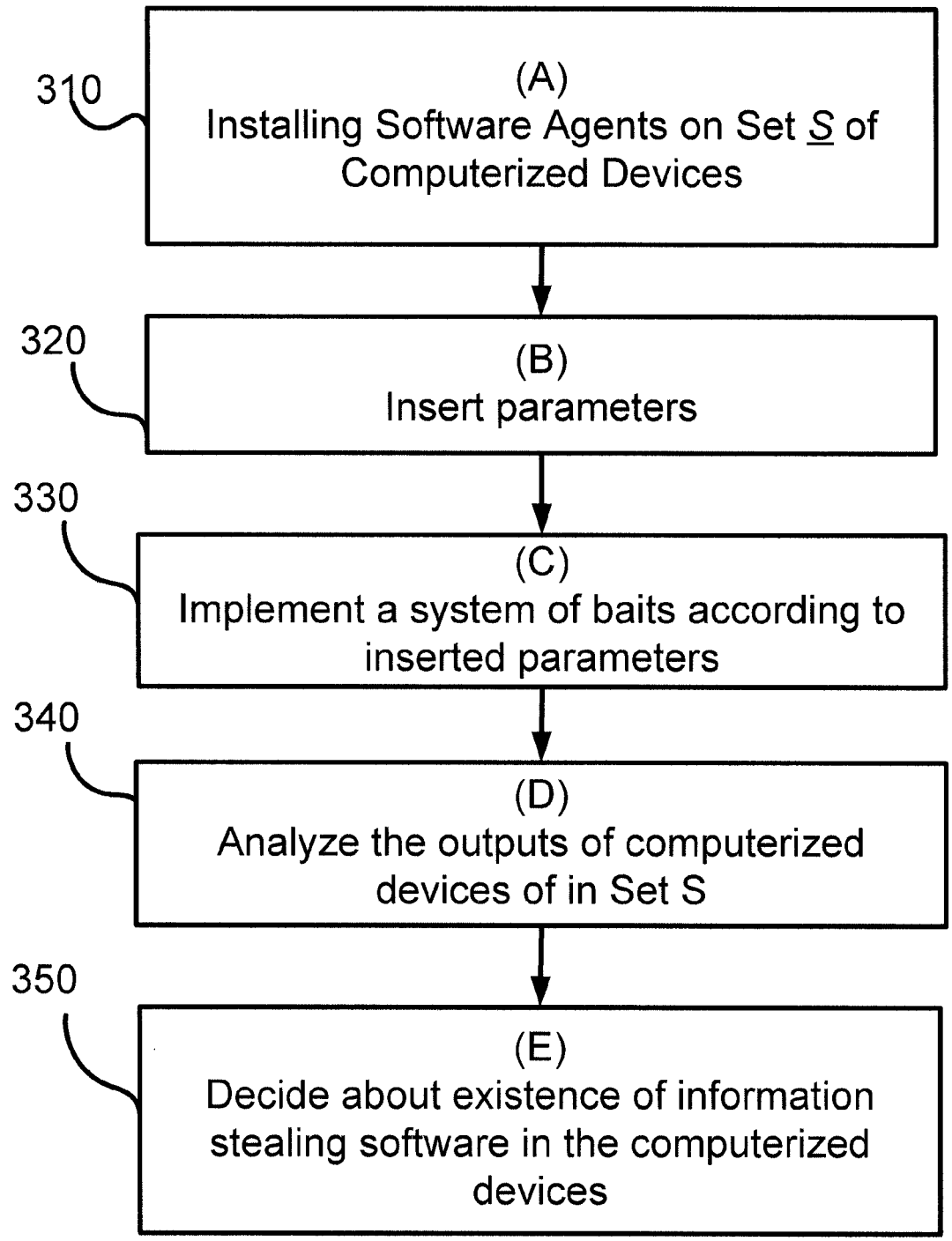
FIG. 3 is flowchart illustrating another method of efficient detection of information stealing software.

FIG. 3 illustrates a method for detection of information stealing software, substantially similar to the method of FIG. 1, but utilizes a two-set method: in stage A, 310, software agents are installed on some of the computerized devices, denoted as set S. At stage B, 320, in order to fine-tune the operation of the software agents, a set of parameters are preferably selected, such as scheduling bait tasks and providing keywords that would produce an attractive bait in this context. At stage C, 330, various baits in the various computerized devices are implemented in accordance with the inserted parameters. At stage D, 340 the output and behavioral patterns of the computerized device are analyzed and compared with those of computerized devices and at stage E, 350, the system estimates the probability that the device is infected by information stealing software.

Figure 4:
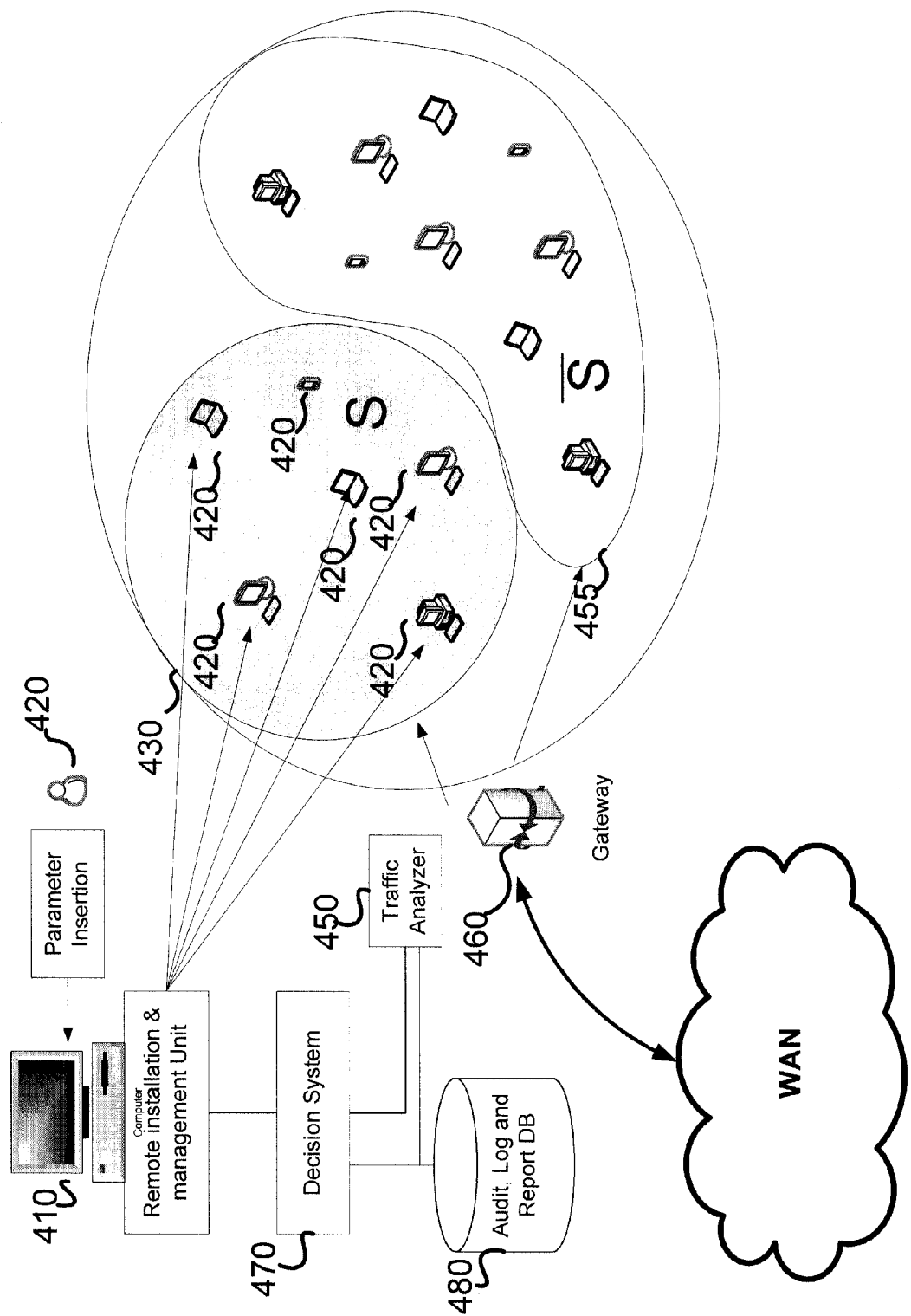
FIG. 4 is an illustration of a system for mitigation of information-stealing software hazards according to FIG. 3.

FIG. 4 illustrates a system for detection of information stealing software, substantially similar to the system of FIG. 2 but utilizing the two-set method to improve detection of information stealing software described in FIG. 3. A remote installation & management unit 410 installs software agents 420 on various computerized devices in the set S 430, (according to parameters inserted optionally by an operator) but not on set 455. The software agents then produce artificial sensitive information baits on the computerized devices of set S 430, and the output and other behavioral parameters of the various computerized devices in the set S and the complementary set $\overline{S}$ are analyzed by a traffic analyzer 450, on a gateway 460. The results are sent for analysis to a decision system 470, which compares characteristics such of the output between sets S and $\overline{S}$ in order to decide about the existence of potentially infected computerized devices or software. Such characteristics may include, for example, the volume of the traffic, the number of TCP sessions, the geographical distribution of the recipients, the entropy of the traffic, the time of the sessions etc. The results of the analysis of the set $\overline{S}$ are thereafter used as a baseline in order to determine the statistical significance of the hypothesis that there are infected computerized devices or software in the set S that react to the existence of the artificial sensitive information baits.

The sets S and $\overline{S}$ may be selected randomly and are changed dynamically in order to provide more information about the identity of the infected machines. The computerized devices in both S and $\overline{S}$ are equipped with software agents which analyze and store outgoing traffic, but only the agents of set S produce artificial sensitive information baits.

Figure 5:
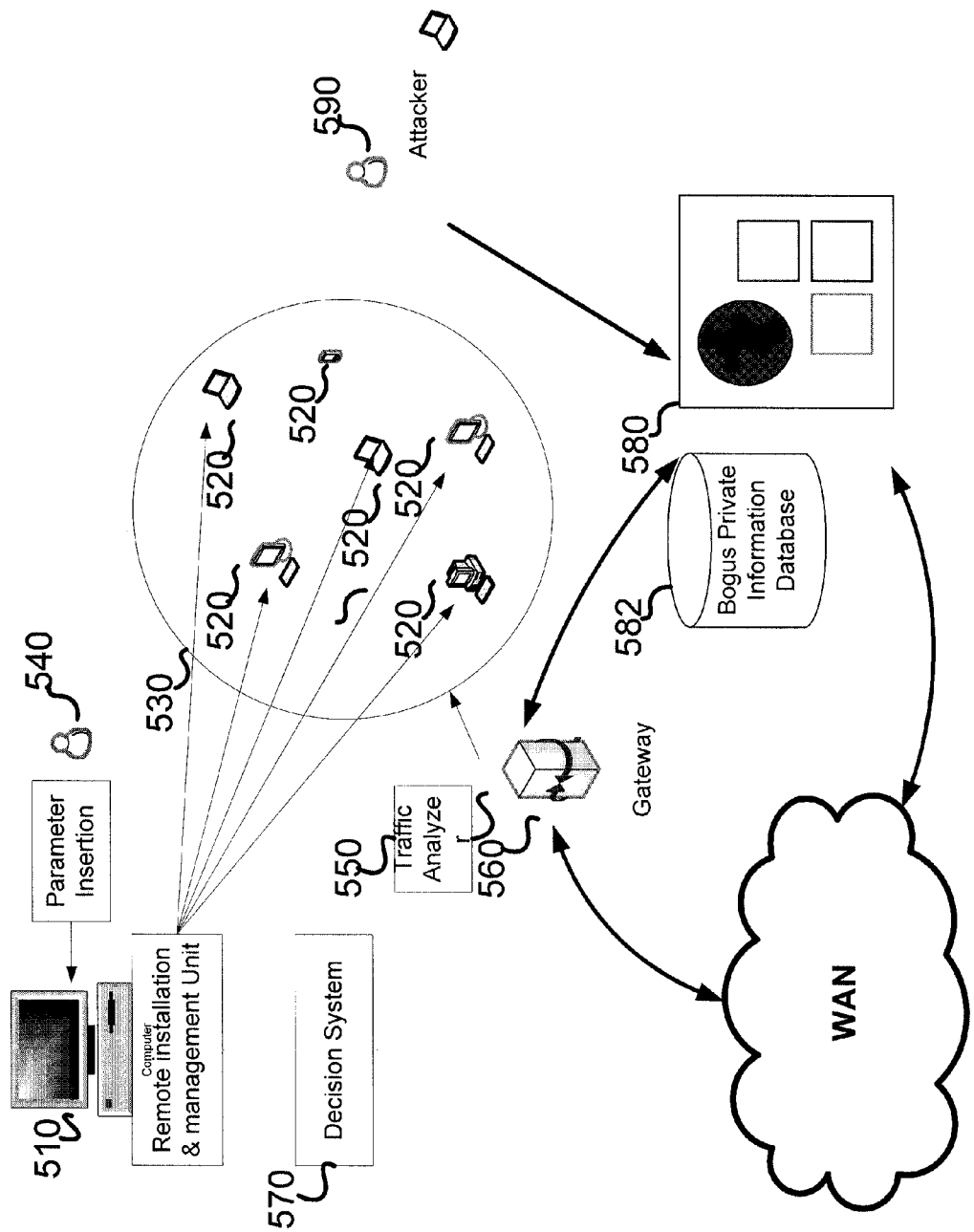
FIG. 5 is an illustration of a system that utilizes a corporation from target sites in order to detect information stealing software.

In some embodiments, the output of the computerized devices may be compared with the output of computerized devices that, with high probability, were not infected—e.g., new machines (real or virtual). In order to further increase the probability of detection, the method may also include cooperation with the sites to which the bogus login details are to be submitted in order to detect attempts to use bogus username, password and other elements of sensitive information. Turning now to FIG. 5, there is illustrated a system that utilizes such cooperation. A remote installation & management unit 510 installs software agents 520 on various computerized devices according to optional parameters inserted by an operator 540. The software agents 520 then produce artificial sensitive information baits, such that each computerized device receives different bogus details. The bogus details are then sent via a gateway 560 to databases 582 at sites 580. If an attacker 590 tries to use a username and password in order to login to the site 580, the site will check the database 582 to determine whether these were bogus details created by the software agents 520, and will send the details of the event to a decision system 570. The decision system 570 determines the infected machines based on the uniqueness of the bogus personal information.

The system can detect patterns that correspond to the information planted by the system that were possibly encoded in order to avoid detection: e.g., the system compares the monitored traffic with the planted content and attempts to decide whether there exists a transformation between the two contents. For example, the system can check for reversing the order of the characters, replacing characters (e.g., S->$), encoding characters using numeric transformations, etc. . . . . The system can also decide that certain patterns are suspicious as attempts to avoid detection.

Furthermore, the system can look at behavioral patterns and correlate them with the planting events in order to achieve a better accuracy level.

According to another aspect, the system identifies and blocks information stealing malicious code that are designed to compromise hosts, collect data, and upload them to a remote location, usually without the users consent or knowledge. These often are installed as part of an attacker's toolkit that are becoming more popular to use, but they can also be part of a targeted attack scheme.

The system can also protect against attempts to steal personal information using methods commonly referred to as "phishing" and "pharming". The method is based on:

Identifying when private or sensitive information (e.g., username, email address and password) are being passed in cleartext over a non-secure connection;

Assessing the risk involved in that scenario; and

Deciding to block or quarantine such attempt according to the sensitivity of the information and the level of risk.

In order to provide an adequate level of security while maintaining minimum interference with the user's work, the system determines whether the destination site is suspicious, and differentiates accordingly between cases in which users send information to suspicious sites and cases in which the information is sent to benign sites. The system can thereafter employ accordingly different strategies, such that for "suspicious" destinations dissemination of potentially sensitive information is blocked.

Suspicious sites can be determined using various heuristics, including:

a. Geolocation to determine whether the location of the site in question is different from the location of the user attempting to access it—For example, it is less likely for someone in North America to access a financial site in Belarus, therefore making the transaction more suspicious.

b. Looking for a string such as www.<popular site>.com somewhere at the end of the URL string. Examples for "popular site" may be paypal, ebay, etc, taken from a predefined list of popular spoofed sites.

The system may also identify cases in which the sensitive private information is posted in cleartext over a non-secure connection, a case that by itself constitutes a problematic situation, and thus may justify blocking or quarantining. The private sensitive information may include credit card numbers, social security numbers, ATM PIN, expiration dates of credit-card numbers etc.

The system may utilize the categorization and classification of websites and then assess the probability that the site is dangerous or malicious based on this categorization (e.g., using blacklists and whitelists), or employ real-time classification of the content of the destination site, in order to assess its integrity and the probability that the site is malicious.

The system can also assess the strength of the password in order to assess the sensitivity level: strong passwords "deserve" higher protection, while common passwords, that can be easily guessed using basic "dictionary attack" can be considered as less sensitive. Note that sites that require strong passwords are in general more sensitive (e.g., financial institutions) while in many cases users select common passwords to "entertainment sites". In a one embodiment, the strength of the password is determined according to at least one of the following parameters:

The length of the password;

Similarity to common passwords, such as those used by "password cracking tools"; or The entropy of the password.

In a preferred embodiment of the present invention, the strength and the entropy of the password are evaluated using the methods described in Appendix A of the National Institute of Standards (NIST) Special Publication 800-63, Electronic Authentication Guideline, the contents of which is hereby incorporated herein by reference in its entirety.

Figure 6:
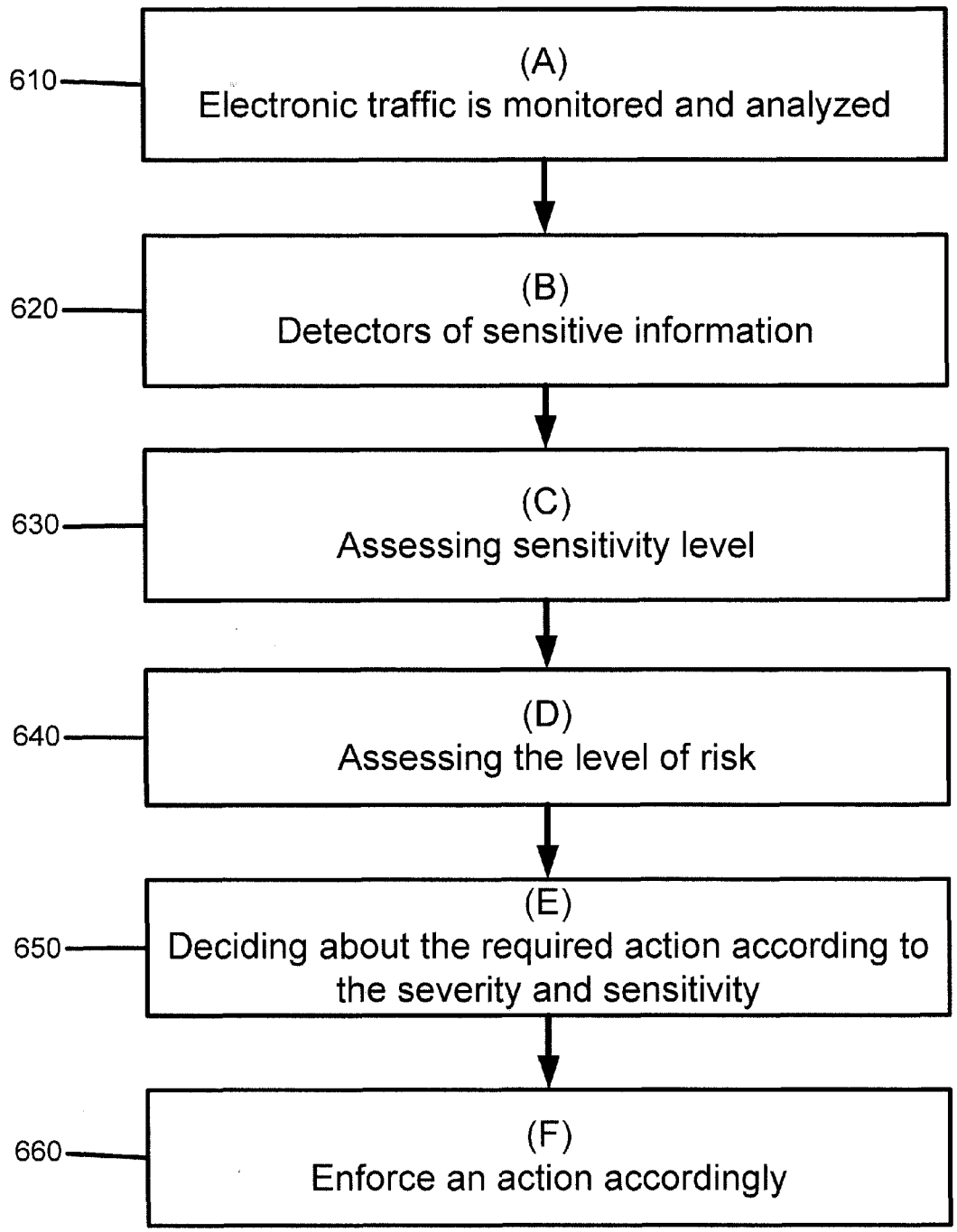
FIG. 6 is a flowchart illustrating another method of efficient detection of information stealing software.

Reference is now made to FIG. 6, which illustrates a method for protection against phishing and pharming attempts. Specifically, the electronic traffic is monitored and analyzed at stage A, 610 possibly using a system that is used also for other applications, such as monitoring and prevention of unauthorized dissemination of information, as described e.g., in U.S. Published Patent Application Nos. 2002/0129140 entitled "A System and a Method for Monitoring Unauthorized Transport of Digital Content" and 2005/0288939, "A method and system for managing confidential information", the contents of which are hereby incorporated by reference herein in their entirety.

At stage B, 620, detectors of sensitive information detect sensitive information such as passwords, usernames, mother maiden names, etc. At stage C, 630, the sensitivity level of the sensitive information is assessed, e.g., by analyzing password strength as explained above, by counting the number of personal details etc. At stage D, 640, the level of risk is assessed using various heuristics, including geolocation, analysis of the URL, previous knowledge about the site, analysis of the content of the site etc. At stage E, 650, the system decides about the required action (such as blocking, quarantine, alert etc.) based on both the sensitivity level and the risk, and at stage F, 660, the system enforces the required action accordingly.

While analyzing sensitivity and risk there may be two clear-cut cases: low risk and low sensitivity case (e.g. sending the password 1234 to a hobby-related site) and high-risk high-sensitivity case (sending many personal details and a strong password in cleartext to a doubtful site). However, dealing with cases in the "gray area" (e.g., "medium sensitivity—low risk" or "medium risk—low sensitivity") may depend on the organizational preferences. Typically, the operator of the system can set parameters that will reflect the organizational trade-off in the risk-sensitivity two-dimensional plane.

Figure 7:
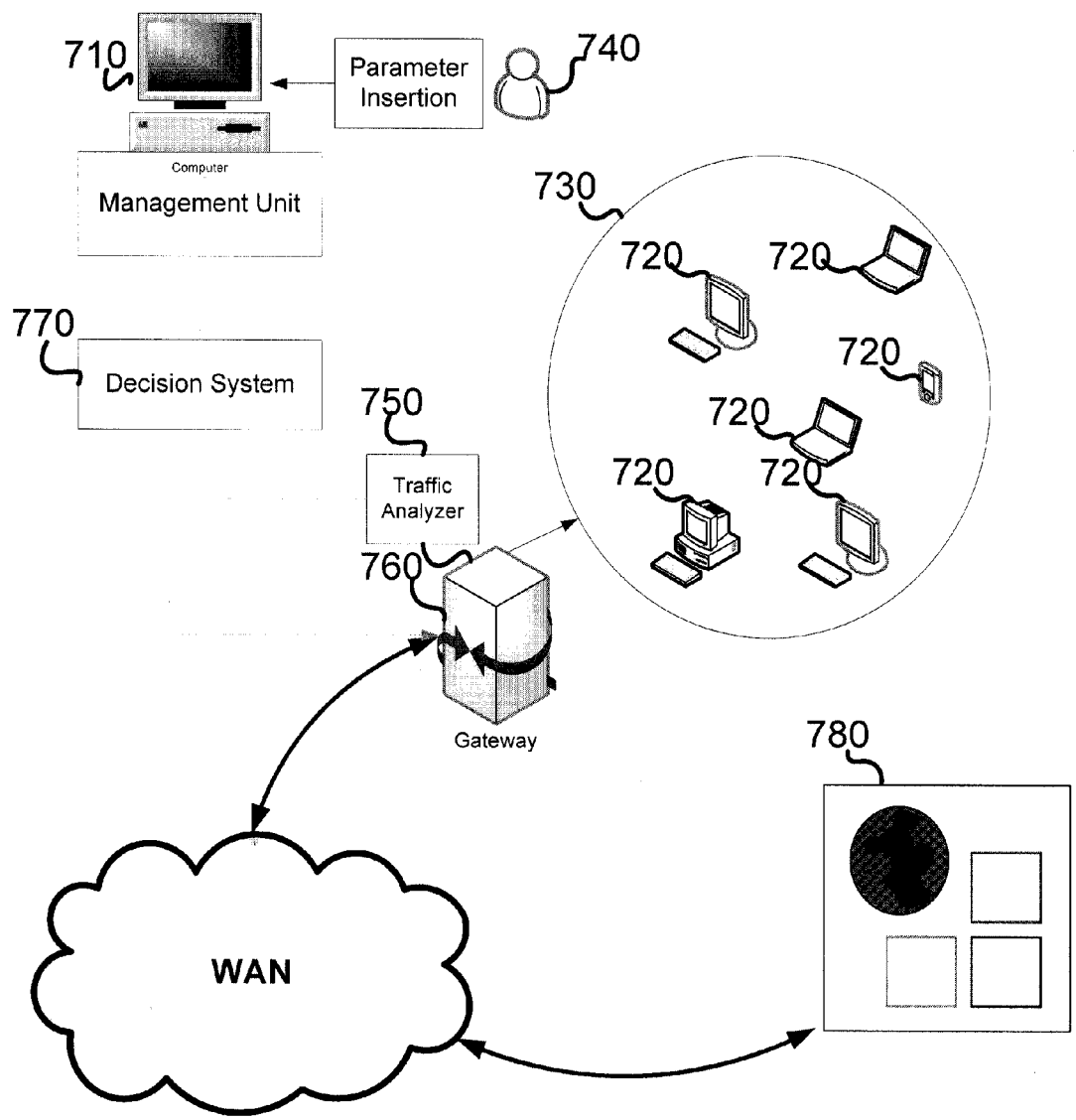
FIG. 7 is an illustration of a system for mitigation of information stealing software hazards according to FIG. 6.

Turning now to FIG. 7, there is an illustration of a system for protection against phishing and pharming attempts, constructed in accordance with the method described in FIG. 6. A management unit 710 is used for setting a policy for protecting computerized devices 720 within the organizational perimeter 730, optionally according to parameters inserted by an operator 740, (e.g., parameters that will reflect the organizational trade-off in the risk-sensitivity two-dimensional plane, as explained above). A traffic analyzer 750 on a gateway 760 monitors incoming and outgoing traffic from at least one computerized device 720 to a site 780 and analyzes the sensitivity and the risk involved in the scenario. The results are sent for analysis to the decision system 770, which decides about the required action and sends instructions accordingly (such as "block", "quarantine" or "alert") to the gateway 760.

The system of FIG. 7 can perform a weak validation to check whether the disseminated password is, with a high-probability, the password used by a user to access his account (or other sensitive resources) inside the organization, without revealing significant information to an attacker who gains access to a weak validation file. This is in contrast to files that allow "strong validation" of passwords, using their hash values—such files are known as highly vulnerable to attacks commonly known as "dictionary attacks".

The weak validation method may be based on a Bloom filter, as described in: *Space/Time Trade-offs in Hash Coding with Allowable Errors*, by H Bloom Burton, *Communications of the ACM*, 13 (7). 422-426, 1970, the contents of which are hereby incorporated herein by reference in their entirety. The Bloom filter can assign a tunable probability to the existence of passwords from the organization password file. When the system tests for the existence of a password in the file, it queries the Bloom filter. If the Bloom filter returns "no" then the password does not exist in the file. If the Bloom filter returns "yes", then it is probable that the password exists in the file, (and therefore in the organization). The Bloom filter therefore provides a probabilistic indication for the existence of a password in the organization, and this probabilistic indication p is tunable by the design of the filter. If p equals to, e.g. 0.9, then there is a false-positive rate of 0.1. Since this validation appears in the context of password dissemination, which by itself conveys a potential risk, this level of false positives is acceptable while monitoring normal traffic.

However, if an attacker attempts a "dictionary attack" (an attack where the attacker systematically tests possible passwords, beginning with words that have a higher probability of being used, such as names, number sequences and places) on the file, the Bloom filter will return "yes" on an expected 10% of the password candidates, even though they do not exist in the file. This will add noise to results of the dictionary attack, making it impractical to distinguish the few true positives from the many false positives.

The same method can be applied in order to safely identify other low-entropy items from a database, without compromising the items themselves to dictionary attacks. For example, suppose that the database comprises 10,000 U.S. Social Security Numbers (SSN). As SSN's are 9 digit numbers, even if they are represented by a strong cryptographic hashes, one can easily conduct an effective dictionary attack over all the valid social security numbers. Utilizing the weak validation method described above, one can assess whether the disseminated 9-digit number is, with a high probability, an SSN from the database.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What is claimed is:

1. A method for monitoring an electronic device to detect infection by unwanted software, the method comprising:
   receiving parameters and inserting the parameters into artificial sensitive information using a software agent running on the electronic device, wherein the parameters include identifying information for the electronic device;
   performing, using the software agent running on the electronic device, a login session using the artificial sensitive information; and
   monitoring, at a computer hardware network gateway, network transmissions of the electronic device unrelated to the login session to detect a transmission of the artificial sensitive information to another electronic device based on a comparison of information included in a network transmission to the artificial sensitive information to determine the existence of unwanted software on the electronic device based on the information identifying the electronic device being included in the transmission of the artificial sensitive information.

2. The method of claim 1, further comprising installing the software agent on the electronic device.

3. The method of claim 1, further comprising performing, using the software agent, the login session by emulating keystrokes on the electronic device.

4. The method of claim 3, further comprising emulating the keystrokes, using the software agent, at a variable rate.

5. The method of claim 1, further comprising:
   detecting encrypted electronic output of the electronic device within the network transmissions of the electronic device;
   correlating an amount of the encrypted electronic output with one or more properties of the artificial sensitive information; and
   determining that the network transmissions of the electronic device include the transmission of the artificial sensitive information based on the correlating.

6. The method of claim 5, further comprising detecting the encrypted electronic output based on an entropy of the network transmissions of the electronic device.

7. The method of claim 1, wherein the electronic output is analyzed by correlating the output with the artificial sensitive information.

8. The method of claim 1, further comprising:
   storing information about the artificial sensitive information in a database; and comparing information from a user with the information in the database in order to determine if the electronic device that transmitted the artificial sensitive information contains unwanted software.

9. The method of claim 1, wherein the software agent performs the login session on a target site, the method further comprising:
configuring the artificial sensitive information to identify the electronic device; and
monitoring the target site for detection of the artificial sensitive information to determine the existence of unwanted software on the electronic device.

10. A system for monitoring an electronic device to detect infection by unwanted software, the system comprising:
a software agent installed on the electronic device and configured to:
receive parameters and insert the parameters into artificial sensitive information, wherein the parameters include identifying information for the electronic device, and
perform a login session using the artificial sensitive information; and
a computer hardware network gateway configured to monitor network transmissions of the electronic device unrelated to the login session that include a transmission of the artificial sensitive information over a network to another electronic device to determine the existence of unwanted software on the electronic device based on the information identifying the electronic device being included in the transmission of the artificial sensitive information.

11. The system of claim 10, further comprising a management unit configured to install the software agent on the electronic device.

12. The system of claim 10, wherein the software agent is configured to perform the login session by emulating keystrokes on the electronic device.

13. The system of claim 12, wherein the software agent is further configured to emulate the keystrokes at a variable rate.

14. The system of claim 10, wherein the computer hardware network gateway is further configured to:
detect encrypted electronic output of the electronic device within the network transmissions of the electronic device;
correlate an amount of the encrypted electronic output with one or more properties of the artificial sensitive information; and
determine that the network transmissions of the electronic device include the transmission of the artificial sensitive information based on the correlating.

15. The system of claim 10, wherein the computer hardware network gateway is further configured to detect the encrypted electronic output based on an entropy of the network transmissions of the electronic device.

16. The system of claim 10, wherein the computer hardware network gateway is further configured to store information about the artificial sensitive information in a database, and to compare information from a user with the information in the database in order to determine if the electronic device that transmitted the artificial sensitive information contains unwanted software.

17. The system of claim 10, wherein the software agent is configured to perform the login session on a target site, and the computer hardware network gateway is configured to monitor the target site for detection of the artificial sensitive information to determine the existence of unwanted software on the electronic device.

* * * * *